Aug. 2, 1960     C. ORR, JR     2,947,164
CASCADE IMPACTOR FOR SAMPLING SMOKES, DUSTS AND FUMES

Filed Jan. 23, 1957     2 Sheets-Sheet 1

INVENTOR.
CLYDE ORR, JR.
BY
ATTORNEY

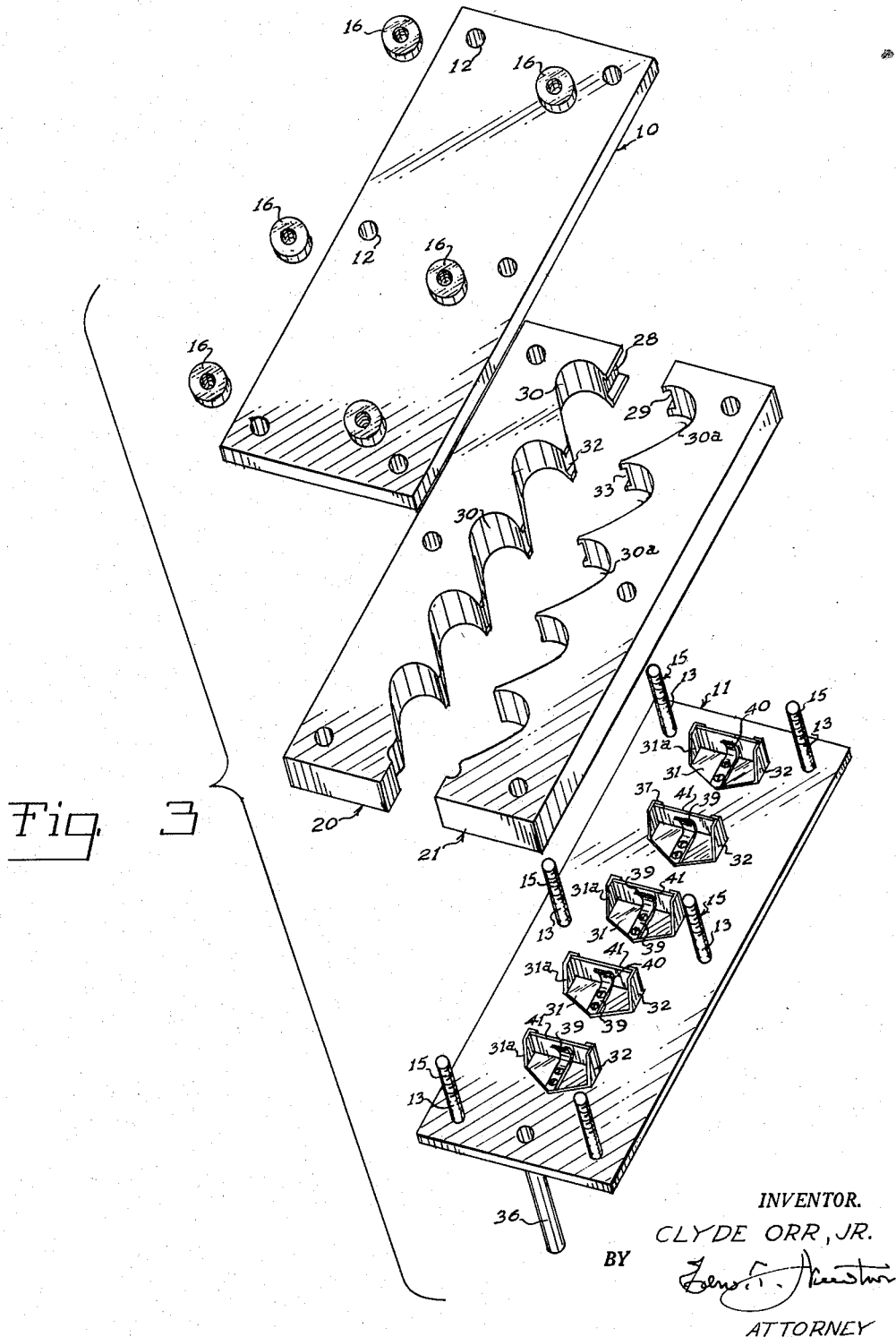

2,947,164
CASCADE IMPACTOR FOR SAMPLING SMOKES, DUSTS, AND FUMES

Clyde Orr, Jr., Atlanta, Ga., assignor to Georgia Tech Research Institute, Atlanta, Ga., a corporation of Georgia Filed Jan. 23, 1957, Ser. No. 635,699

5 Claims. (Cl. 73—28)

This invention relates to sampling devices for aerosol particles such as may be contained in smoke, dust and fumes, and is particularly concerned with a cascade impact type sampling device by which individual separation of various classes of particles may be achieved.

In widely diversified fields of scientific research, it has become increasingly important to analyze the nature, quantity and particulate size of air borne particles known as aerosols such as may be carried by smokes, dusts and fumes. Many and various types of inspection devices have been designed and have received commercial recognition as to efficiency and effectiveness. One type of such device operates on the impact principle in which the particles are directed in force against a collection plate, the surface of which is provided with adhesive by which the particles are retained thereon. In some instances the retention surface may be a movable film or disk so as to provide for an elongated testing period before inspection of the receiving surface. Such apparatus has also been designed in the form of a succession of related inspection units which are designated as "cascade" impactors, since in their operation the fluid being tested passes in series from one such unit to another. While many of these apparatuses have been successfully used for some time, problems have arisen with respect to the construction and operation. In particular, visual inspection of the receiving surfaces during operation has not been provided for in simple structures lending themselves to economy of construction and operation. It will, of course, be recognized that in the scientific testing of aerosol bodies, great accuracy must be maintained in order to effect any dependability of the findings. Where metallic structures are relied upon, the problems arising from the accurate machining of surfaces to maintain such tolerances as will insure authenticity in the scientific data achieved are quite difficult. Furthermore, such materials are readily subjected to wide dimensional variations in response to temperature changes. Furthermore, such metallic structures are not only complicated and expensive, but fail to provide the highly desirable, visual inspection during operation.

It is therefore one of the objects of the present invention to provide a novel, simple and improved impact sampling device for the testing of the aerosol particle content of fluids which will be simple in construction, effective and efficient in operation and well adapted to meet the demands of economic manufacture.

A further object of the present invention is to provide an impact sampling device of the character set forth which will be of cascade action in that the device includes successive test units to which the fluid is passed in series from one to another.

Another object of the present invention is to provide apparatus of the class described, in which the successive test units incorporated in a single structure are so constructed and arranged as to provide for the selective isolation of air borne particulate matters of different character.

It is also an object of the present invention to provide a test instrument for sampling aerosol particles in which the collection of particles may be fully visualized during the operation as well as providing for the retention of particles of subsequent study.

The objects of the invention also include that of providing in at least one modification of the basic inventive concept a mechanism by which the collection surface may be moved during the inspection operation so as to expose successive areas of the material-receiving surfaces to the material being tested, whereby a prolonged operation is had without the necessity of terminating the test at short intervals for the purpose of renewing the particle receiving surfaces.

These and numerous other objects, features and advantages of the present invention will be apparent from consideration of the following specification taken in conjunction with the accompanying drawings, in which:

Fig. 3 is an exploded view of the parts of the apparatus disclosed in Figs. 1 and 2.

While the present invention may be carried out with various structural and design modifications, that form of the invention here shown by way of illustration may be briefly defined as consisting of front and rear transparent cover members, such as may be readily formed of Lucite or equivalent transparent material. Between the front and rear cover members there is provided a two part block, also preferably of Lucite or the like, formed to provide a successive intercommunicating series of generally cardioidal shaped chambers, the apex of each leading into the upward re-entrance curve of the next subadjacent chamber. In each chamber there is located a bracket which supports a particle receiving slide at the mouth of the inlet passage from the apex of the preceding chamber, the surface of which slide may be treated adhesively to retain particles thereon. An important feature of the invention is the fact that the successive passages formed between the successive chambers are of decreasing cross-section, so that the fluid vehicle carrying aerosol particles is increasingly rapid in its movement, such increased velocity being effective in the successive chambers to provide for a successive series of particle entrapments, each successive chamber receiving particles moving at greater velocity and thus being more forcefully imparted on the slide thereof. At the upper end of the block there is provided an inlet for the material to be tested which constitutes a port leading into the upper chamber.

Figure 4:
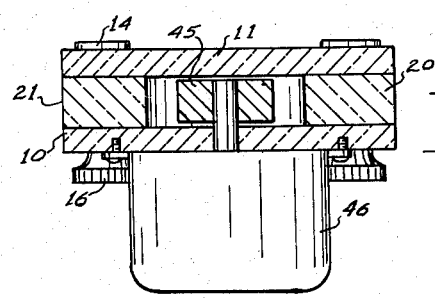
Fig. 4 is a cross-sectional view of a modification of the invention showing a rotating collection receiving surface.

An exit port provided with a suitable exhaust fitting is provided at the lower end of the device communicating with the last chamber. While the number of chambers is not critical, a series of five are here shown. In a modification of the device as shown in Fig. 4, the slides are substituted by a rotated cylinder which may be driven in a suitable manner and at such speed as to provide for a prolonged operation as compared with that which would be permitted by the use of the slides.

Figure 1:
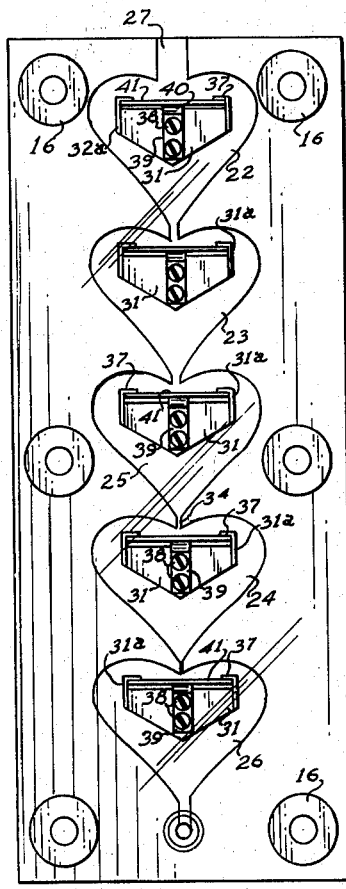
Fig. 1 is a front elevation of one form of the present invention.
Figure 2:
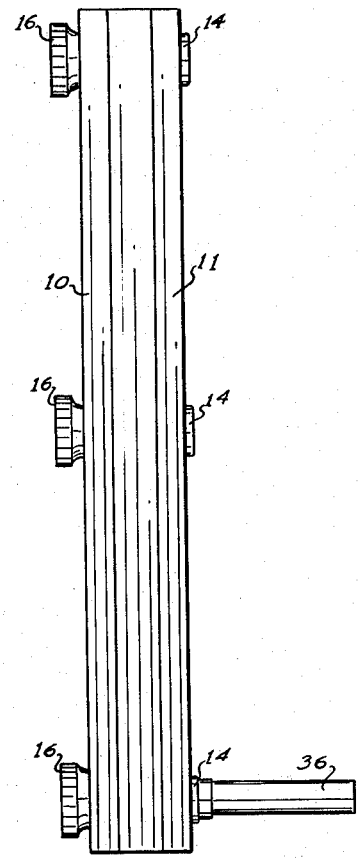
Fig. 2 is a side elevation of that form of the invention shown in Fig. 1.

Referring now to that form of the present invention presented in Figs. 1, 2 and 3 of the drawings, it will be seen that the device has substantially identical, generally rectangular, front and rear cover plates 10 and 11, each of which is apertured as at 12 to receive therethrough the shanks 13 of securing elements, the heads 14 of which are here shown as engaging the outer face of the rear cover plate while the threaded terminals 15 of the shanks receive readily disengageable securing nuts 16. For ease in manufacture, as well as economy, and particularly in the interest of observation during operation, the cover plates 10 and 11 are preferably formed of Lucite or some equivalent transparent material.

Mounted between the cover plates 10 and 11 there is provided a two-part central block co-extensive with the cover plates. The block is most conveniently formed of complementary side pieces 20 and 21, the confronting edges of which are formed to provide a series of intercommunicating substantially cardioidal chambers here shown as five in number, and being identified from top to bottom as chambers 22, 23, 24, 25, and 26. At the upper end of the block, a port 27 is provided which leads into the center of the re-entrant curve at the top of the first chamber 22. It will, of course, be understood that the port 27 is formed by cooperating and registering grooves 28 and 29 (Fig. 3) in the confronting faces of the pieces 20 and 21 while the chambers are formed by cooperating recesses 30 and 30a. The successively restricted jetting ports between chambers are similarly formed by the grooves 32 and 33 of Fig. 3. The apex of each chamber is formed with a jetting aperture or port 34 leading to the center of the re-entrant curve of the upper surface of the next lower successive chamber.

An important feature of the invention is that the jetting port cross-section diminishes from chamber to chamber so that the fluid vehicle which is under inspection will be delivered at increasing velocities from chamber to chamber. Below the apex of the lower chamber, a discharge tube 36 is provided which extends through the rear cover 11 to be attached to any suitable suction mechanism or to discharge the fluid after testing.

Within each chamber there is provided a bracket, including base 31 and side flanges 31a extending transversely through the chamber, the upper edges of the flanges being provided with retaining wings 37. The brackets are mounted upon the rear wall of each chamber by securement to the rear cover plate by means of screws 38 which also engage a vertical springleaf 39, the upper portion of which is turned horizontally and forwardly in the chamber as at 40 so as to provide spring pressure for the undersurface of a series of rectangular material-receiving slides 41 which are retained under the wings 37.

In the operation of this device, it will be understood that with the structure as arranged in Fig. 1, the fluid medium containing the aerosol particles to be tested is admitted to the upper chamber through its top port. Such admission may be under pressure, or inducted by suction applied to the tube 36. Since the velocity of the fluid as it enters the device is at its lowest, only heavier particles will be impinged against the adhesive covered slide of the first chamber with such force as to be retained on the upper surface of such slide. The lighter particles will be free of adhesive engagement, due to the fact that the velocities of such lighter particles are so low that they are not sufficient to cause the particles' adherence. As the fluid vehicle with its heavier particles trapped upon the upper plate passes through the first port leading to the second chamber, the velocity is increased since the port is of less cross-section than the admission port, and hence particles of smaller weight will be impinged more vigorously against the upper surface of the second plate, and the heavier of such particles will adhere thereto while the still lighter particles will pass on to the third chamber and so on throughout all the successive chambers. As the particle weights diminish, higher velocities are required to provide an impact force sufficient to adhesively secure them to the upper surface of the plates. It will of course be understood that this process of selective elimination takes place in each successive chamber until the fluid vehicle is finally discharged.

In that form of the invention shown in Fig. 4 the plates are replaced by rotating drums 45 which may be actuated by a suitable rotating or timing mechanism generally indicated at 46 so as to rotate the drum as the particles are fed through the apparatus. Hence, rather than a single small adhesive surface, each jetting port is provided with a relatively elongate surface successively subjected to the blast from the jets of the interconnected chambers, and thus in this form of the invention a continuous operation may be achieved over a much longer period of time. The drums 45 may of course be periodically indexed as well as continuously rotated.

In the operation of the device, when the testing period has been completed, it will be seen that the apparatus may be readily disassembled by loosening the nuts and removal of the front cover plate, at which time the individual reception slides may be slipped from their spring engagement, and comparisons and studies of the material adhering thereto will form the basis for a comprehensive understanding of the matter entrained in the carrying fluid.

In considering the invention, it will be understood that the invention is not limited or confined to the number of chambers provided, to the material or to specific structural details. While the exact configuration of the chambers is desirably of a modified cardioidal form, having a sharp lower apex, other configurations may be admirably adapted. Therefore, in the practice of the invention, numerous changes, modifications and the full use of equivalents may be resorted to without departure from the spirit or scope of the invention as defined in the appended claims.

I claim:

1. In a device of the character described, a casing defining an interconnected series of chambers of generally cardioidal configuration and generally uniform size in which the apex of each of said chambers forms a port leading from the bottom of one chamber into the re-entrant curve at the top of the next adjacent chamber, and an adhesive member in each chamber for retaining thereon particulate material borne by a fluid passing from chamber to chamber of said device by way of said ports, the ports connecting said chambers being of successively diminishing cross-section in the direction of fluid flow through the device.

2. A cascade impactor for sampling fluids for aerosol particles including front and rear transparent covers, an upright body mounted between said covers comprising a pair of edgewise confronting blocks defining therebetween an interconnected successive series of chambers one above the other, particulate material receiving means in each chamber, and ducts for successively delivering fluid material from one chamber to the next subadjacent chamber, said ducts being of varying cross-section diminishing in the direction of flow of the fluid, each chamber being of generally cardioidal configuration with the inlet duct at the center of the re-entrant top curve thereof.

3. A cascade impactor for sampling fluids for aerosol particles including front and rear transparent covers, a body mounted between said covers comprising a pair of edgewise confronting blocks defining therebetween a successive series of chambers, particulate material receiving means in each chamber, and ducts for successively delivering fluid material from one chamber to the next adjacent chamber, said ducts being of varying cross-section diminishing in the direction of flow of the fluid, each chamber being of generally cardioidal configuration with the inlet duct at the center of the re-entrant top curve thereof and the outlet duct adjacent the center of the lower apex thereof.

4. The device set forth in claim 3 in which the particulate material receiving means includes an adhesive coated slide, and means releasably supporting said slide including a bracket having wings disposed over the ends of said slide and a spring bearing against the bottom of said slide.

5. The device set forth in claim 3 in which the material receiving means in each chamber includes an adhesive coated cylinder, and means for rotating said cylinder to successively present the surface thereof to the inlet duct of each chamber.

References Cited in the file of this patent

UNITED STATES PATENTS

| | | |
|---|---|---|
| 2,034,185 | Hultain | Mar. 17, 1936 |
| 2,310,871 | Robertson | Feb. 9, 1943 |
| 2,312,295 | Dahlman et al. | Feb. 23, 1943 |
| 2,538,116 | May | Jan. 16, 1951 |